US005890579A

United States Patent [19]
Young

[11] Patent Number: 5,890,579
[45] Date of Patent: Apr. 6, 1999

[54] APPARATUS FOR SEPARATING AND DEALING INDIVIDUAL BOARDS FROM AN UNINTERRUPTED MAT OF BOARDS TO A CONVEYOR

[76] Inventor: Robert H. Young, 2902 Bethel Church Rd., Beaver Dam, Ky. 42320

[21] Appl. No.: 911,581

[22] Filed: Aug. 14, 1997

[51] Int. Cl.[6] .................................................. B65G 47/26
[52] U.S. Cl. ..................................... 198/459.6; 198/459.7
[58] Field of Search ............................ 198/459.6, 459.7, 198/459.1, 460.3, 462.1, 462.2, 463.5, 463.6

[56] References Cited

U.S. PATENT DOCUMENTS

| | | | |
|---|---|---|---|
| 2,732,867 | 1/1956 | May et al. ............................. | 144/128 |
| 2,748,917 | 6/1956 | Rawe ................................... | 198/462.2 |
| 2,980,234 | 4/1961 | De Koning ............................. | 198/34 |
| 3,071,235 | 1/1963 | Randall ................................ | 198/463.5 |
| 3,182,785 | 5/1965 | Tourtellotte .......................... | 198/127 |
| 3,209,890 | 10/1965 | Miles .................................. | 198/459.1 |
| 3,608,695 | 9/1971 | Hellstrom ............................. | 198/463.5 |
| 3,989,135 | 11/1976 | Pyykonen .............................. | 198/461 |
| 4,077,524 | 3/1978 | Rysti .................................. | 214/8.5 A |
| 4,164,279 | 8/1979 | Dubuit ................................. | 198/459.1 |
| 4,945,976 | 8/1990 | Ritola ................................. | 198/461 |
| 5,813,512 | 9/1998 | Andersson et al. ..................... | 198/463.5 |

FOREIGN PATENT DOCUMENTS

1034055 6/1966 United Kingdom ................ 198/459.6

Primary Examiner—William E. Terrell
Assistant Examiner—Khoi H. Tran
Attorney, Agent, or Firm—Maurice L. Miller, Jr.

[57] ABSTRACT

An apparatus for gathering an uninterrupted mat of boards from an inbound conveyor and for periodically separating and dealing individual ones of the boards to an outbound conveyor is disclosed. A roller accumulator having a first series of transversely spaced apart rows of closely spaced, inline rollers is provided between the inbound and outbound conveyors. A fixed gate having a plurality of transversely spaced apart, trapezoidally shaped plates is mounted next to the downstream end of the accumulator. Upstream facing vertical edges of the plates form a stop against which boards delivered to the accumulator are gathered. Inclined upper edges of the plates contain a second series of rows of closely spaced, in-line rollers extending from an upper end of the stop diagonally downwardly to an inlet end of the outbound conveyor. A pair of transversely spaced apart power operated, drive belt loops containing outwardly projecting, flexible brushes are disposed over the accumulator and fixed gate and are operative to drive boards along both series of rollers. A movable singulation gate operates periodically to tilt a leading edge of a most downstream one of the boards on the accumulator upwardly over the stop such that the brushes and the urging of the remaining boards on the accumulator cause the tilted board to be lifted onto the second roller series and, thereafter, to be delivered by the brushes to the outbound conveyor.

12 Claims, 6 Drawing Sheets

APPARATUS FOR SEPARATING AND DEALING INDIVIDUAL BOARDS FROM AN UNINTERRUPTED MAT OF BOARDS TO A CONVEYOR

BACKGROUND OF THE INVENTION

This invention relates generally to mechanisms for feeding elongated bodies such as beams, timbers, planks and boards individually and periodically from an unseparated layer of such bodies to an outbound conveyor system.

In a finishing saw mill, for example, it is frequently necessary to position a series of wood boards on a conveyor with the boards more or less evenly spaced apart. In this way, the spaced apart boards can be transported by a conveyor, such as a multi-chain conveyor, to a work station wherein a trimming, facing or other finishing operation can be performed on each board, one at a time, and in relatively rapid sequence. This invention has to do with an improved board feeding apparatus for separating and dealing individual boards of widely varying lengths and widths from an uninterrupted layer or mat of such boards to an outbound conveyor.

Broadly speaking, such mechanisms have long been known and used in the prior art. See, for example, U.S. Pat. No. 4,945,976 issued to E. Ritola on Aug. 7, 1990; U.S. Pat. No. 4,077,524 issued to A. Rysti on Mar. 7, 1978; U.S. Pat. No. 3,989,135 issued to N. Pyykonen on Nov. 2, 1976; U.S. Pat. No. 3,182,785 issued to M. C. Tourtellotte on May 11, 1965; and U.S. Pat. No. 2,980,234 issued to E. W. De Koning on Apr. 18, 1961. A problem encountered particularly with the Ritola and Rysti mechanisms is that they can not deal effectively with boards of widely varying widths. Moreover, none of subject mechanisms can deal effectively with boards having widely varying lengths. For example, boards dealt by the De Koning machine must be at least be slightly longer than the space between two adjacent ones of the reference stops 60 plus the transverse offset distance between one of the stops 60 and the nearest one of the wheels 70. Also, boards short enough to engage only two of the reference stops 60 and two corresponding offset wheels 70 must be carefully positioned on the inbound conveyor. Moreover, the mechanism of De Koning is complicated by the fact that the system for dealing individual boards from a mat of boards requires three separate sets of chain conveyors, namely, an inbound conveyor 44, a holding conveyor 10, and an outbound conveyor 12. Clearly, these three conveyors must be carefully synchronized relative to one another.

By means of the present invention, these and other problems encountered in prior art board separating and dealing machines are substantially eliminated.

SUMMARY OF THE INVENTION

It is a object of my invention to provide an apparatus for periodically separating and dealing individual boards from an uninterrupted mat of boards.

Briefly, in accordance with the present invention, there is provided a frame, and a board conveyor system which has an inbound section and an outboard section. Also provided is a roller accumulator mounted of the frame for receiving a plurality of boards thereon from the inbound section. A fixed gate is provided which is disposed between the accumulator and an inlet end of the outbound section. The fixed gate includes a raised stop element disposed at a downstream end of the accumulator which extends above a board bearing upper surface thereof for preventing further downstream movement of the boards and for permitting an uninterrupted mat of boards to accumulate thereon. The fixed gate also includes a first series of transversely spaced apart rows of closely spaced apart, in-line rollers rotatably mounted on and along an inclined upper surface thereof. The first roller rows extend from an upper end of the stop diagonally downwardly to an inlet end of the outbound section. A pair of transversely spaced apart, longitudinally extending power operated endless belts is also provided. The belts are movably mounted on the frame and contain outwardly projecting flexible drive brushes. The belts have an operative, board transporting run in a downstream direction above and parallel to the accumulator and above the fixed gate. The operative run extends from an upstream end of the accumulator to the outbound section. Lastly, there is included a power operated, singulation gate movably attached to the frame for operating periodically to tilt a leading edge of a most downstream one of the boards in the mat upwardly above the stop such that the movement of the brushes and the urgings of the remaining boards in the mat under the influence of the movement of the inbound section cause the one board to be lifted over the stop onto the first roller rows and, thereafter, to be delivered by the brushes along the first roller rows to the outbound section.

These and other objects, features and advantages of the present invention will become apparent to those skilled in the art from the following detailed description and attached drawings, upon which, by way of example, only a preferred embodiment of my invention is illustrated.

DESCRIPTION OF THE PREFERRED EMBODIMENT

Referring now to the drawing figures and, in particular, to FIGS. 1–5, there is shown, in a preferred embodiment of my invention, an apparatus, generally designated 10, for periodically separating and dealing individual boards, as at 12a and 12b, from an uninterrupted sheet or mat of boards 12 in a conventional endless chain conveyor. The chain conveyor of the present example is exemplary only and includes a conventional set of six transversely spaced apart, power operated, endless chains 14 (see particularly FIG. 5) movably mounted in a usual and well known manner on a suitable frame 16.

Figure 1:
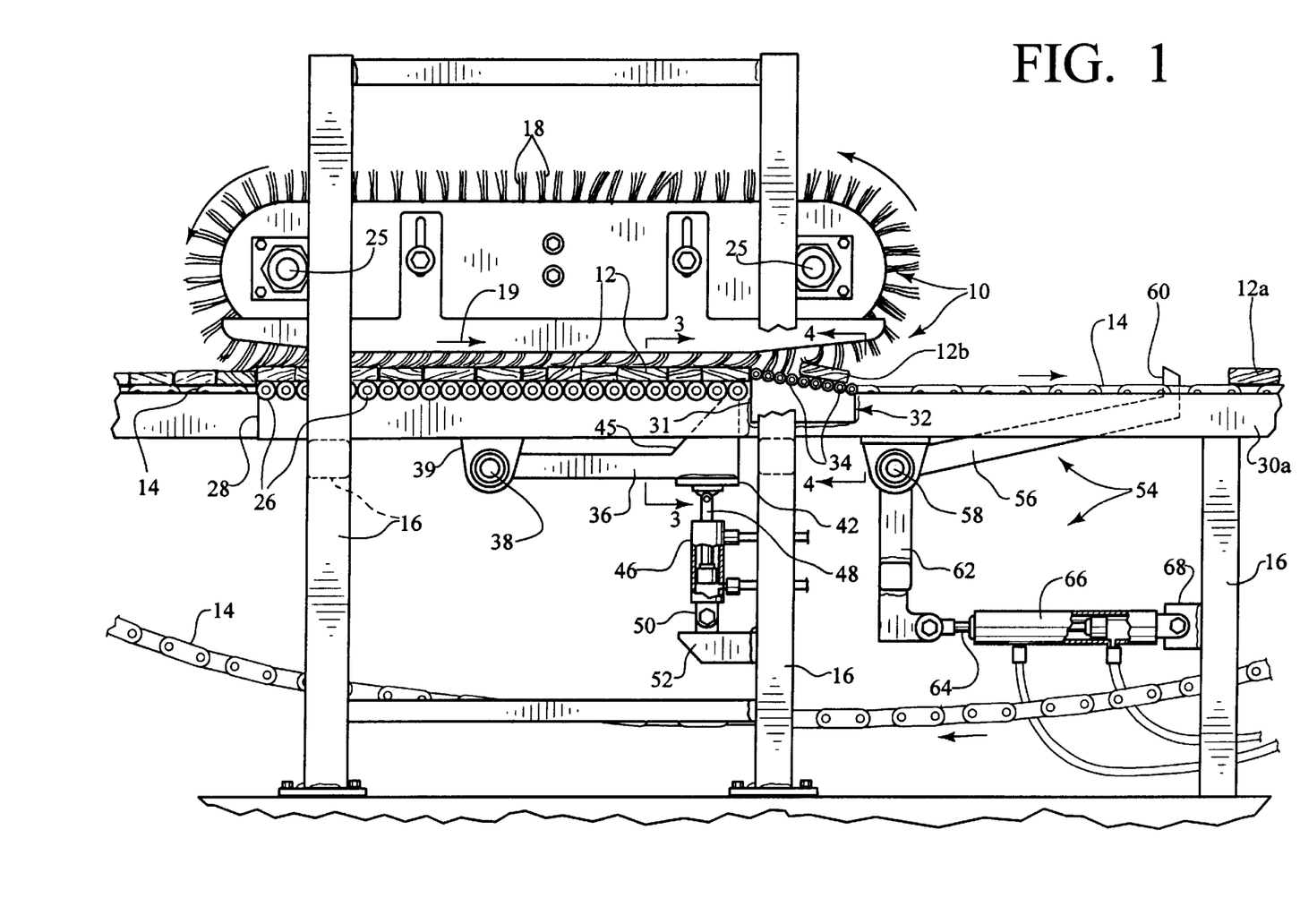
FIG. 1 shows a side elevation view of a novel board separating and dealing assembly used in association with a conventional endless multi-chain conveyor, thus illustrating a preferred embodiment of my invention.
Figure 2:
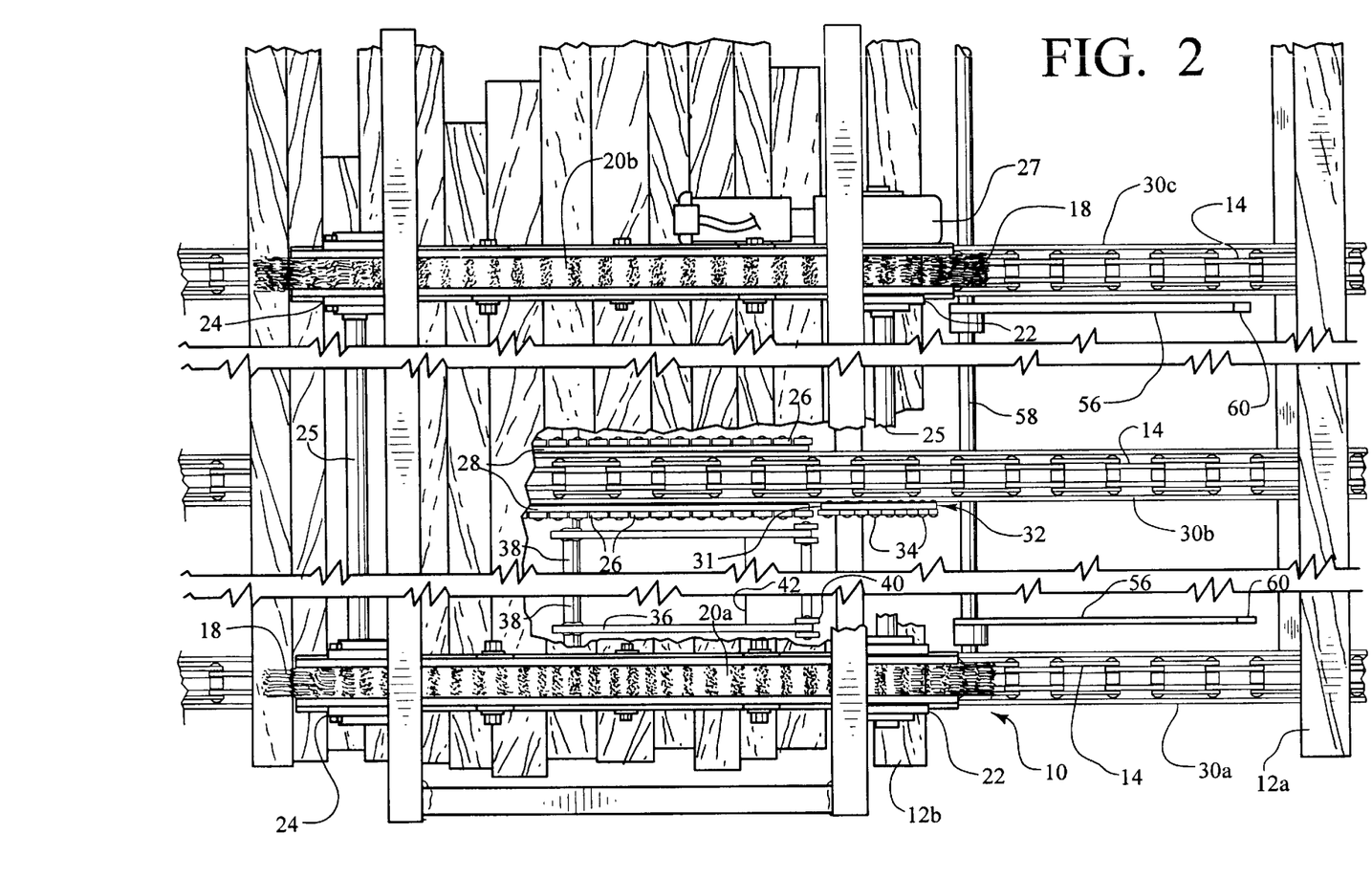
FIG. 2 shows a top plan view of the assembly and a portion of the conveyor of FIG. 1 with certain parts being partially torn away to expose otherwise hidden portions of the assembly.

The apparatus 10 of the present example includes a conventional endless belt drive mechanism containing outwardly projecting flexible drive brushes 18 mounted on two spaced apart, longitudinally extending drive belts 20a and 20b (FIG. 2). Each of the drive belts 20a and 20b travel around and between a pair of sprockets 22 and 24, the sprockets on corresponding ends of both belts being joined by cylindrically shaped shafts 25. The brushes 18 may be constructed of any suitable flexible material such as, for example, polyprophylene plastic. One of the sprockets 22 is rotatably driven by a conventional electric motor 27 to thus drive an operative lower, downstream run, as indicated by an arrow in FIG. 1 labeled 19, of the brushes 18 above and parallel to the boards 12 between inbound and outbound sections of the chains 14, which sections are located beyond upstream and downstream ends, respectively, of the apparatus 10. The apparatus 10 also includes six rows of aligned, and free rolling or passive rollers 26 rotatably mounted on upper edges of six elongated plates 28, different pairs of which plates are, in turn, secured to opposite sides of three different, three sided channels 30a, b and c in which three different chains 14 of the chain conveyor system are slidably disposed for movement in the downstream direction (See FIGS. 1–2 and, in particular, the six roller rows 26 and plates 28 in FIG. 3). Thus, the rollers 26 and plates 28 are mounted on the three chain channels 30a, b and c, two of which are located directly under the belts 20a and 20b and the third of which is located under and between such belts. Note, with reference to FIGS. 1 and 3, that the rollers 26 have board bearing upper surfaces which extend slightly above the chains 14, by, preferably, ⅛ inch to ¼ inch, such that, when the boards 12 are disposed on the rollers 26 under the influence of the drive brushes 18, they ride entirely on the rollers 26 and are disposed above and travel completely out of contact with an underlying central section of the chains 14. The transversely spaced apart, longitudinally extending rows of the closely spaced, in-line rollers 26 therefore form a roller accumulator 26 upon which a plurality of the boards 12 can be received from the inbound section of the conveyor chains. It is important that at least one row of the rollers 26 of the accumulator be associated with each of the conveyor chains 14 across the apparatus 10 and across the entire width of the conveyor so that the longest boards which span the entire width of the conveyor do not have a tendency to yaw after delivery onto the accumulator 26. Such yawing movement of a long board will have a tendency to cause undesirable gaps to exit in the mat of boards 12 under and between the drive belts 20a and 20b which could interfere with the ability of the apparatus 10 to deal boards effectively when required.

The boards 12 are therefore conveyed by the chain 14 to the apparatus 10 from the left side of FIGS. 1–2 as viewed. Upon reaching the plates 28 and the first upstream ones of the rollers of the accumulator 26, a leading edge of a leading one of the boards 12 shifts slightly upwardly onto and over the first upstream rollers 26, whereupon the brushes 18 engage the upper surface of that board to propel it slightly upwardly onto and, thereafter, along the rows of rollers above the chains 14 until it encounters another component of the apparatus 10 namely, a stop or barrier to further board movement, the stop being the upstream facing vertical edges 31 of three plates which form a fixed gate generally designated 32. The gate 32 (see FIG. 4) comprises three trapezoidally shaped plates (see FIGS. 1 and 6–9) which are welded or otherwise suitably secured to one side of each of the three chain channels 30a, b and c next to the downstream end of three of the roller plates 28 of the accumulator 26, which roller plates are also secured to the same chain channels 30a, b and c (See FIG. 4). A series of passive, free rolling rows of rollers 34 are rollably connected to the inclined upper edges of the plates 32 and extend from an upper end of the edges or stop 31 diagonally downwardly to an inlet end of the outlet section of the conveyor chains 14.

Figure 3:
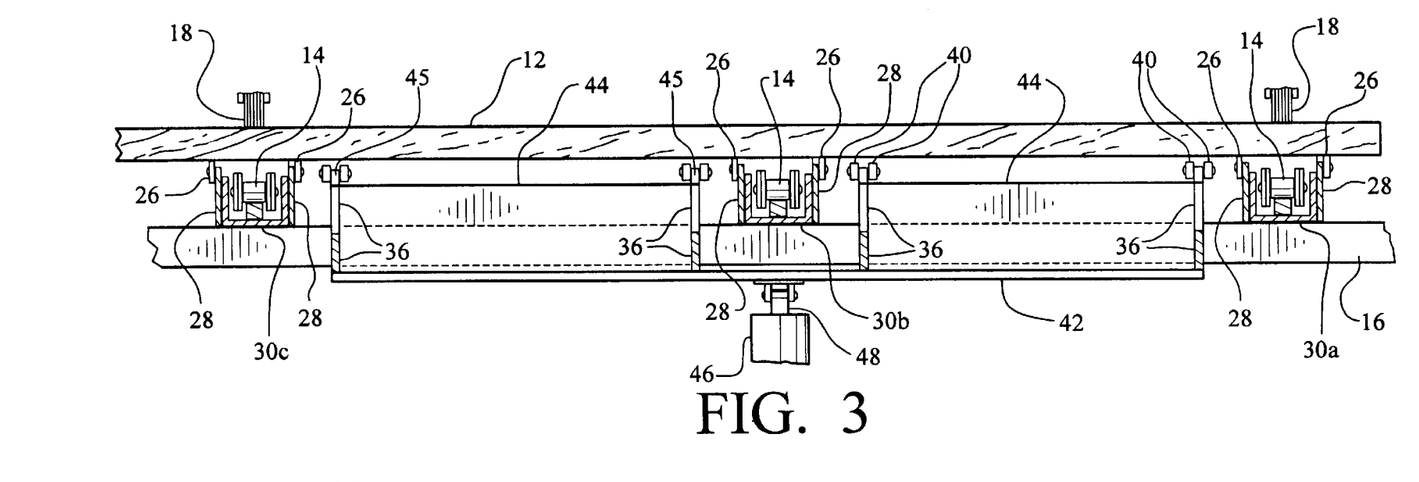
FIG. 3 shows a cross-sectional view of the assembly and conveyor of FIGS. 1–2 as viewed in a downstream direction along cross-section lines 3—3 of FIG. 1.
Figure 4:
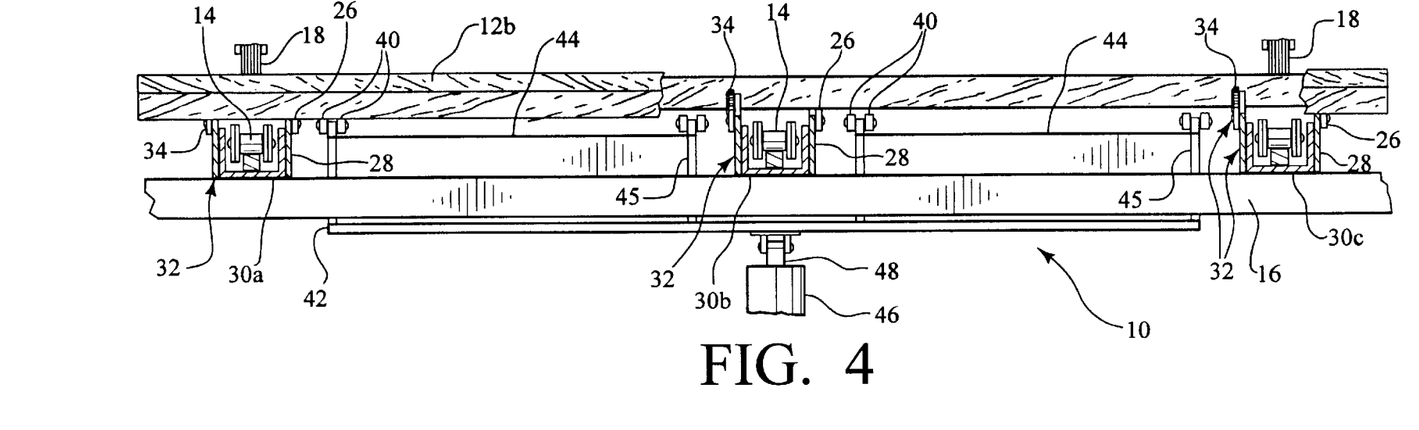
FIG. 4 shows another cross-section view of the assembly and conveyor of FIGS. 1–3 as viewed in an upstream direction along cross section lines 4—4 of FIG. 1.

The apparatus 10 also includes a power operated singulation gate having four transversely spaced apart arms 36 (see FIGS. 1 and 3) which are pivotally connected on corresponding upstream ends thereof to a cylindrically shaped shaft 38, which shaft is, in turn, held in a pair of blocks 39 which are connected to the underside of the chain channels 30a and 30c. Since both blocks 39 are identical, only the block connected to the channel 30a is shown. The singulation gate or arms 36 are generally L-shaped and each contains a pair of passive, free rolling rollers 40 (see FIGS. 3–4) which is rollably mounted on an upper free end of an upwardly projecting leg 45 thereof. The four arms 36 are connected together for movement in unison by an elongated base plate 42. A pair of backing plates 44 adds rigidity to the vertically extending legs 45 (see FIGS. 3–4). The arms 26 and rollers 40 of the singulation gate can be raised and lowered together as necessary, as later more fully explained, by a double acting air cylinder 46 having a piston rod 48 which is, in turn, pivotably connected to the base plate 42. As shown in FIGS. 3–4, the cylinder 46 is attached to the longitudinal center of the plate 42 directly beneath the chain channel 30b. A base of the cylinder 46 is pivotally connected, as at 50, to a support bar 52. The support bar 52 is, in turn, welded or otherwise suitably connected to a leg of the frame 16 so as to project outwardly therefrom in an upstream direction. The pivotally movable arms 36 and attached rollers 40 thus form a singulation gate for periodically separating lead boards from the mat 12 upon operation of the cylinder 46 as later more fully explained. As shown best in FIGS. 6–9, the rollers 40 of the singulation gate are located at the downstream end of the accumulator 26 next to and upstream of the stop edges 31 of the fixed gate 32.

Figure 5:
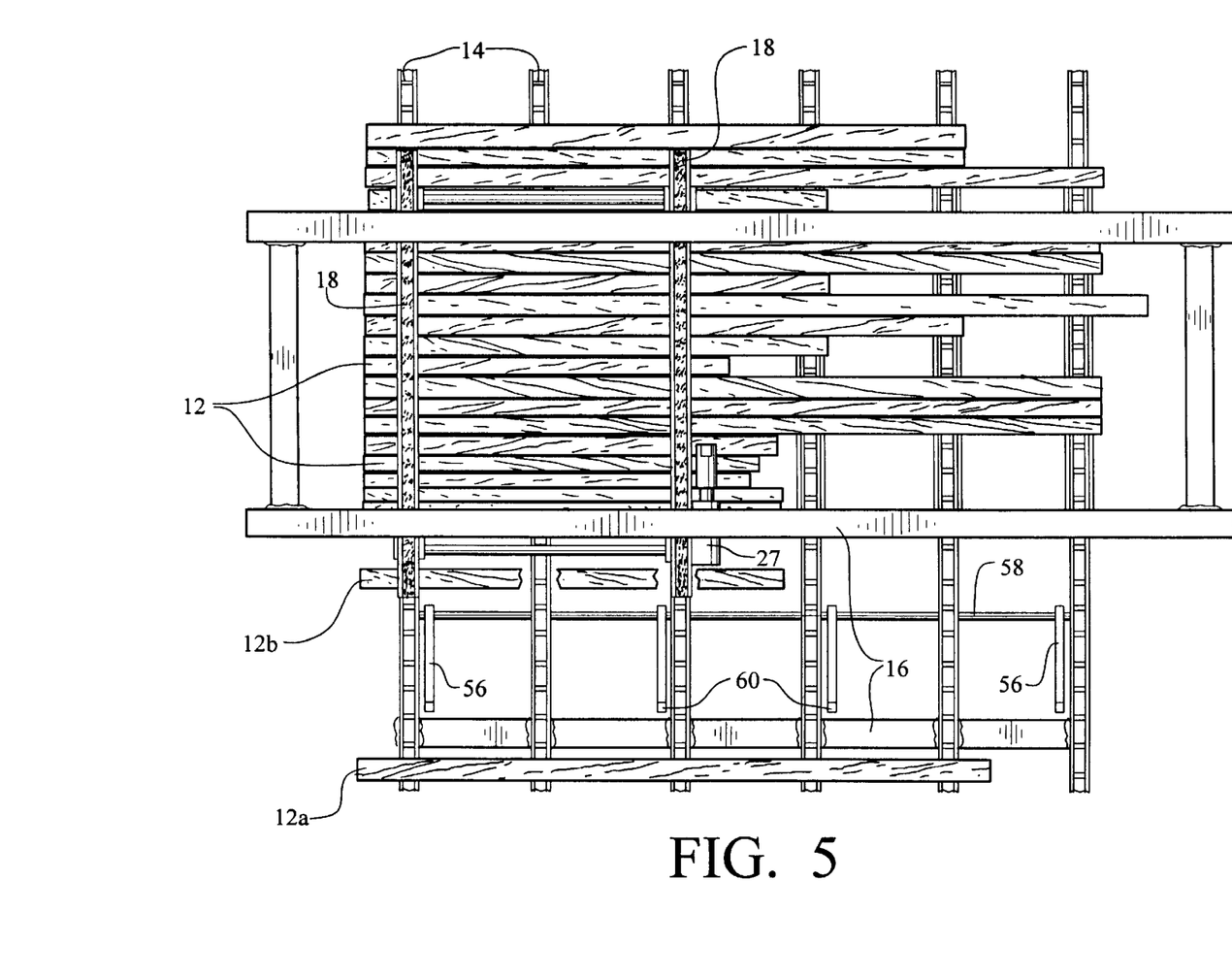
FIG. 5 shows a plan view of the assembly and the entire width of the multi-chain conveyor of FIGS. 1–4.

Downstream of the apparatus 10 is located one or more transversely spaced apart and conventional board spacing devices, generally designated 54, each of which devices includes a series of four arms 56 pivotally attached to a cylindrically shaped shaft 58 (See particularly FIGS. 1 and 5). The arms 56 each include an upwardly projecting end member 60. A like series of intermediate arms 62 is pivotally connected between the shaft 58 and a piston rod 64 of a second double acting air cylinder 66. The arms 56 and 62 are fixedly joined so as to rotate together on the shaft 58. A base end of the cylinder 66 is pivotally connected to a support plate 68 which is welded or otherwise suitably attached to a leg of the frame 16. While only one such board spacing device 54 is shown in the drawings, it will be appreciated that several such devices could be similarly installed at equally spaced apart positions along the board carrying surface of the outbound section of the chain conveyor downstream of the apparatus 10. The actual number of such devices 54 employed would depend upon the length of such chain conveyor carrying surface and the distance apart that it is desired to maintain individual boards after their separation from the mat 12 by the apparatus 10 as they are thereafter carried by the chains 14 toward a remote work station or drop off point.

Figure 6:
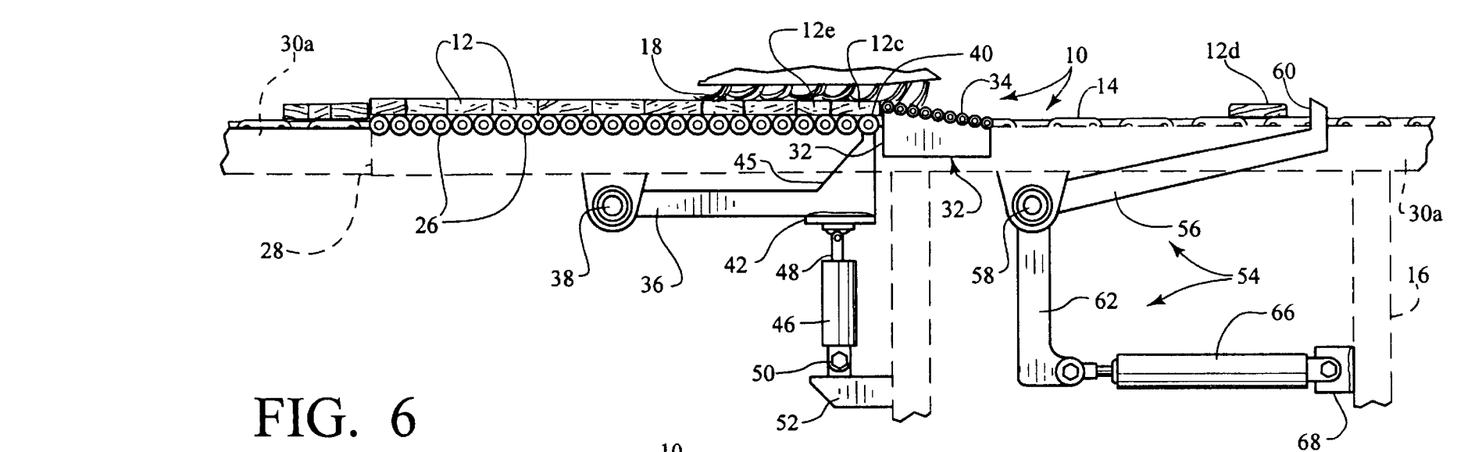
FIGS. 6–9 show four similar side elevation views of a fragment of the assembly of FIGS. 1–5 showing, schematically, four distinct steps in the sequence of a single operation of the assembly of the latter mentioned figures in periodically separating and dealing one board at a time from a mat of boards.

With reference particularly to FIGS. 6–9, the operation of the apparatus 10 will now be explained. Assume, initially, that the apparatus 10 is in the condition as shown in FIG. 6 wherein the cylinder rods 48 and 64 are both fully retracted by the cylinders 46 and 66, respectively, and that the mat of boards 12 is tightly bunched together on the accumulator 26 with a lead board 12c of the bunch 12 being jammed against the stop edges 31 of the fixed gate 32. Many of the boards 12 are located upon the roller accumulator 26 above and out of contact with the moving and underlying chains 14. As shown in FIG. 1, the boards in the mat 12 upon the accumulator 26, including the lead board 12c, are located under the brushes 18, which brushes simply slide across the upper surfaces of these several boards, thus continuing to urge them against the stop 31 to form the desired uninterrupted mat. With the cylinder rod 48 fully retracted as shown in FIG. 6, the rollers 40 on the legs 45 of the singulation gate 36 are spaced below a downstream underside edge portion of the lead board 12c so as not to be in contact therewith. See also FIGS. 3–4 wherein the cylinder rod 48 is also shown in a retracted state, such that the rollers 40 are spaced below the level of the boards 12, the boards as shown being entirely supported on the six rows of rollers of the accumulator 26. Also, assume that, as a result of an immediately preceding operation of the apparatus 10, a board 12d has been separated and dealt from the mat 12 and is traveling along the outbound section of the chains 14 downstream of the apparatus toward the end members 60 of the arms 56, the arms 56 then being in a fully raised position as a result of the piston 64 of cylinder 66 being fully retracted. In this condition, the end members 60 are raised to a position to stop the board 12d from moving passed them when that board reaches that position.

Figure 7:
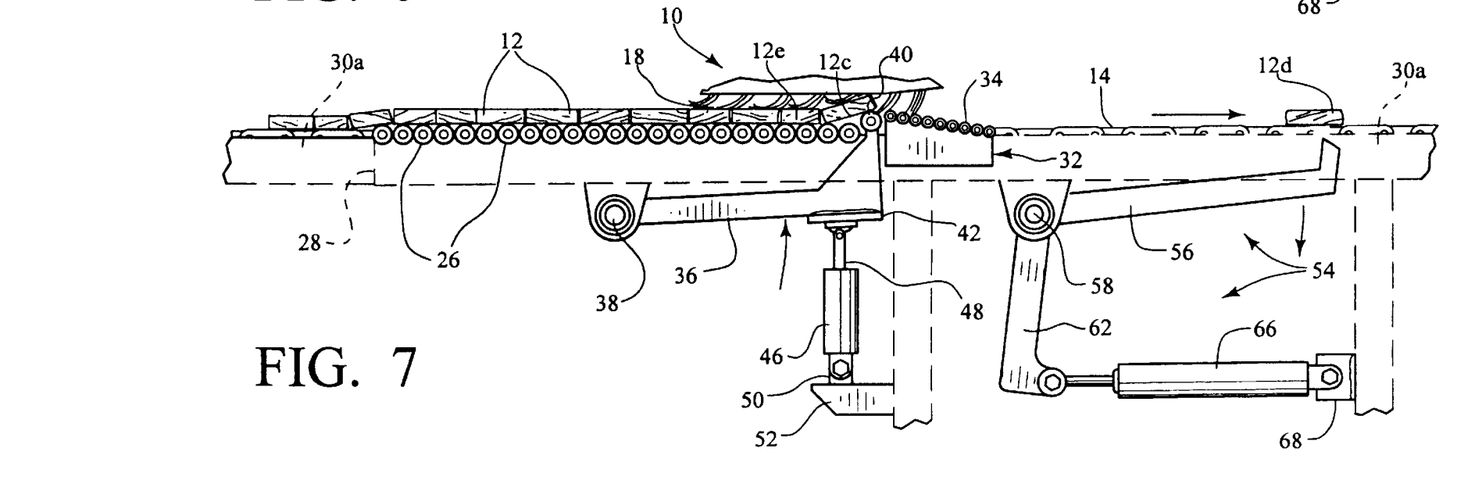
Figure 8:
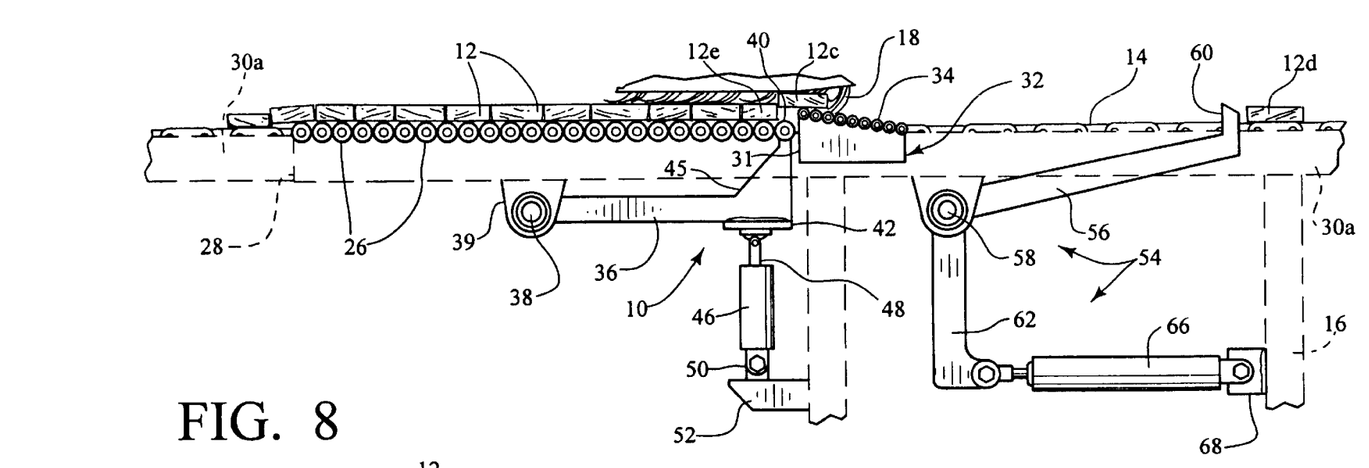

After a time period when the chains 14 have traveled along the channels 30a, b and c at least far enough to have moved the board 12d into engagement with the end members 60, the cylinders 46 and 66 are operated, preferably automatically, to extend the piston rods 48 and 64 to, in part, rotate the arms 62. clockwise on the pivot shaft 58 as viewed to lower the arm 56 to the position as shown in FIG. 7. With the arm 56 lowered as shown, the end member 60 is now at a recessed position below the level of the chains 14 to permit the previously dealt board 12d to proceed further downstream to either a work station, drop off point or to a next board spacing device similar to the device 54, whichever may be the case. At the same time, the cylinder 46 operates to extend the piston rod 48 to move the arm 36 upwardly, whereupon the rollers 40 engage a leading downstream edge portion of the underside surface of the board 12c to tilt a leading edge of that board, upwardly further against the brushes 18 above the upper ends of the stop edges 31 and onto upstream ones of the rollers 34 of the fixed gate 32. As a result of the downstream urgings of the boards 12 traveling behind and against the now tilted board 12c under the influence of both the inbound sections of the chains 14 traveling toward an upstream end of the apparatus 10 and of the operative run 19 of the overhead brushes 18, the board 12c is lifted upwardly onto the upstream end of the rollers 34 of the fixed gate 32 as shown in FIG. 8. After the upward operation of the singulation gate the cylinders 46 and 66 are immediately operated together to retract the piston rods 48 and 64 to lower the singulation gate 36 to its fully lowered position and to raise the end members 60 back to interfering relation above the chain 14 downstream of the board 12c. Note, as shown in FIG. 8, that retraction of the cylinders 46 and 66 should be timed with the running speed of the chains 14 to assure that the previously dealt board 12d will have progressed downstream beyond the end members 60 so as not to be disturbed by their return to the raised position. Immediate retraction of the singulation gate 32 after its upward movement is necessary so that only one board is dealt at a time and so that the rollers 40 will be retracted before the next board in the mat is pushed against the stop edges 31. In this manner a temporarily or transiently stationary uninterrupted matt of boards is formed against the stop prior to each successive operation of the singulation gate 32 to lift a next successive one of the boards of the matt.

Figure 9:
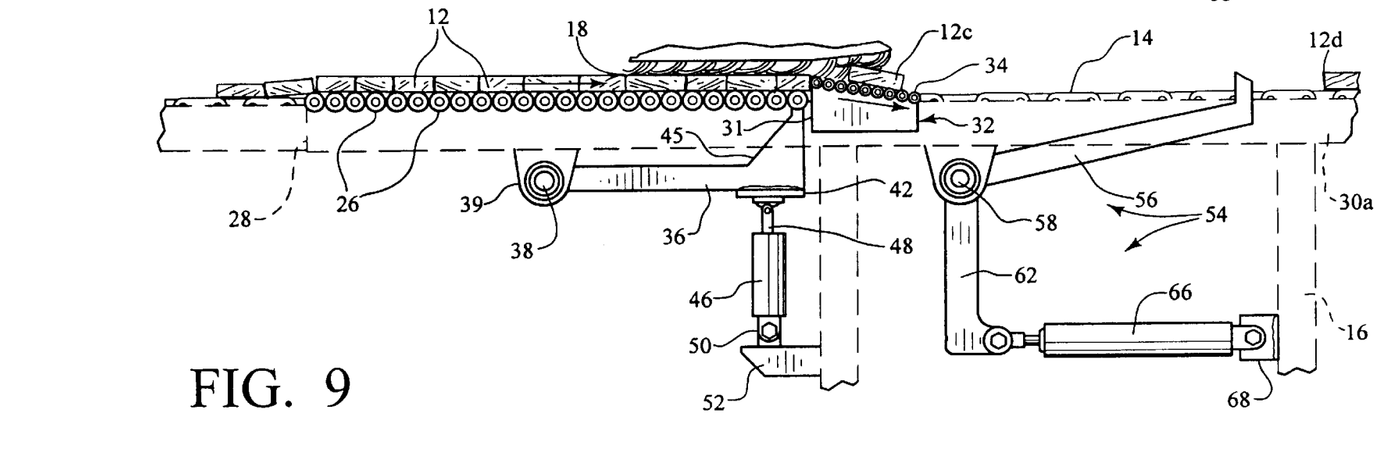

FIG. 9 shows the board 12c having been separated from the mat 12 and proceeding down the inclined row of passive rollers 34 of the fixed gate 32 under the influence of the operative run 19 of the brushes 18. At the end of this descent, the board 12c will be deposited on the outbound section of the chains 14 downstream of the apparatus 10 and will proceed upon the chains toward the end members 60 while the next board 12e in line is held against the stop edges 31 to await being separated and dealt from the mat 12 during a next cycle of operation of the singulation gate 36.

Note with reference to FIG. 5 that a wide variety of board lengths can be handled by the apparatus 10 of my invention. In one such system that I have constructed and tested, board lengths from three to eighteen feet can readily be handled. This is because I set the two brush belts 20a and b at slightly less than three feet apart over the chain channels 30a and c on the side of the chain conveyor 14 and frame 16 on which ends of the boards 12 of various lengths are aligned with one another. See FIGS. 2 and 5. Thus, so long as a given board is long enough to fit under both brush belts 20a and b, it can be effectively handled by the apparatus of my invention. I have also found that the apparatus 10 can effectively handle boards of widely varying widths, typically in the range of from 1¼ inches up to 24 inches in width. Such narrow width boards can be readily dealt periodically by the apparatus 10 because the rollers 40 on the upper ends of the legs 45 are of similarly small diameter and because the legs are generally triangularly shaped and are, preferably, relatively narrow at their upper ends. This is also possible because of the relatively rapid operation cylinder 46 in raising and, immediately, thereafter, lowering the singulation gate 36, both of which actions constitute a single operation of the singulation gate.

Although the present invention has been described with respect to specific details of a certain preferred embodiment thereof, it is not intended that such details limit the scope and coverage of this patent other than as expressly set forth in the following claims. Those skilled in the art will appreciate that certain modifications of these details can be made without departing from the spirit of my invention.

I claim:

1. An apparatus for separating and dealing individual boards from an uninterrupted mat of boards comprising a frame;

a board conveyor system having an inbound section and an outbound section, said inbound section having an inlet end and an outlet end, and said outbound section also having an inlet end and an outlet end;

a roller accumulator having a board bearing upper surface mounted on said frame for receiving a plurality of boards thereon from said inbound section;

a fixed gate disposed between said accumulator and the inlet end of said outbound section, said fixed gate including a raised stop element disposed at a downstream end of said accumulator and extending above the board bearing upper surface thereof for preventing further downstream movement of said boards and for permitting an uninterrupted mat of boards to accumulate thereon, said fixed gate also including a first series of transversely spaced apart rows of closely spaced, in-line rollers rotatably mounted on and along an inclined upper surface thereof, said first roller rows extending from an upper end of said stop diagonally downwardly to the inlet end of said outbound section;

a pair of transversely spaced apart, longitudinally extending, power operated endless belts movably mounted on said frame, said belts containing outwardly projecting flexible drive brushes, and having an operative, board transporting run in a downstream direction above and parallel to said accumulator and above said fixed gate, said operative run extending from an upstream end of said accumulator to said outbound section; and a power operated, singulation gate movably attached to said frame for operating periodically to tilt a leading edge of a most downstream one of said boards in said mat upwardly above said stop such that the movement of said brushes and the urgings of the remaining boards in said mat under the influence of the movement of said inbound section cause said one board to be lifted over said stop onto said first roller rows and, thereafter, to be delivered by said brushes along said first roller rows to said outbound section.

2. The apparatus of claim 1 wherein said conveyor system comprises a series of transversely spaced apart longitudinally extending, endless chains having a central section and an operative run in said downstream direction, the board bearing upper surface of said accumulator being spaced above said chains such that said boards can be delivered from said inbound section onto said accumulator above and out of contact with the central section of said chains.

3. The apparatus of claim 1 wherein said roller accumulator comprises a second series of transversely spaced apart, longitudinally extending rows of closely spaced apart, in-line rollers extending from the outlet end of said inbound section to said fixed gate.

4. The apparatus of claim 1 wherein said fixed gate comprises a fourth series of transversely spaced apart, relatively flat plates fixedly mounted on said frame.

5. The apparatus of claim 1 wherein said singulation gate comprises a series of transversely spaced apart, longitudinally extending L-shaped arms pivotally attached on corresponding ends thereof to said frame, said arms being adjoined for movement in unison, each of said arms containing an upwardly extending leg on a free end thereof and a roller element rotatably attached to an upper end of each said leg for contact with a leading edge portion of an underside surface of said most downstream one of said boards upon activation of said singulation gate.

6. The apparatus of claim 1 further comprising a first double acting air cylinder attached on a base end thereof to said frame, a piston rod of said first cylinder being attached to said singulation gate for periodic movement said singulation gate between a recessed position out of contact with said downstream one of said boards and an advanced position to upwardly tilt said leading edge.

7. The apparatus of claim 1 wherein said conveyor system comprises a transversely spaced apart, longitudinally extending series of endless chains having an operative board carrying run in a downstream direction and having an inbound section for feeding boards to and upon said accumulator, said each chain having a central section running longitudinally between and below the board bearing upper surface of said accumulator and between and below at least an upper portion of said stop, and an outboard section for receiving boards from said first series of roller rows of said fixed gate.

8. The apparatus of claim 1 further comprising at least one board spacer device movably mounted on said frame and located on said outbound section longitudinally spaced downstream of said fixed gate.

9. The apparatus of claim 3 wherein said conveyor system comprises a transversely spaced apart, longitudinally extending plurality of endless chains having an operative board carrying run in a downstream direction and a like plurality of three sided channels forming part of said frame and having open upper ends, each of said chains being slidably disposed in a different one of said channels with a board carrying upper surface of said chains extending upwardly out of said channels, said accumulator further comprising a pair of elongated plates attached to opposite sides of each of said channels between said inbound section and said fixed gate, each of said second series of roller rows being rotatably mounted on a different upper edge of said elongated plates, a board bearing upper surface of said series of roller rows being spaced above said operative run of chains.

10. The apparatus of claim 9 wherein said fixed gate comprises a series of transversely spaced apart, relatively flat plates fixedly attached to a side wall of at least some of said channels so as to be under and between said belts, including being directly under said belts.

11. A process for separating and dealing individual boards from an uninterrupted mat of boards, the steps of which comprise (a) providing a board bearing accumulator having a first plurality of transversely spaced apart, longitudinally extending rows of closely spaced, in-line rollers, said accumulator having an upstream end and a downstream end;

(b) delivering a series of boards to and upon said accumulator from said upstream end;

(c) providing a fixed gate next to a downstream end of said accumulator forming a stop against which boards on said accumulator can be urged, said fixed gate including a second plurality of transversely spaced apart rows of closely spaced, in-line rollers extending diagonally downwardly from an upper end of said stop to an inlet to an outbound conveyor;

(d) urging said boards on said accumulator against said stop to form a transiently uninterrupted mat of said boards;

(e) tilting a leading edge of a most downstream one of said boards on said accumulator upwardly above an upper end of said stop;

(f) drawing said most downstream one of said boards over said stop onto said second plurality of roller rows following the step of tilting while moving the remaining boards in said mat against said stop;

(g) moving said most downstream one of said boards downwardly along said second plurality of roller rows while urging the remainder of said boards against said stop; and (h) delivering said most downstream one of said boards from said second plurality of roller rows to said outlet section.

12. The process of claim 11 the steps of which further comprise urging said remaining boards of said mat against stop for a predetermined time period following the tilting of said most downstream one of said boards; and, upon the elapse of said time period, repeating steps (e) through (h).

* * * * *

UNITED STATES PATENT AND TRADEMARK OFFICE
CERTIFICATE OF CORRECTION

PATENT NO. : 5,890,579
DATED : April 6, 1999
INVENTOR(S) : Robert H. Young, 2902 Bethel Church Rd.,
Beaver Dam, KY 42320

It is certified that error appears in the above-indentified patent and that said Letters Patent is hereby corrected as shown below:

On the title page:

[57], line 6, ABSTRACT
"inline" should read --in-line--

Col. 8, line 44, Description of the Preferred Embodiment,
after "transiently" and before "uninterrupted"
insert the word --stationary--

Signed and Sealed this

Seventeenth Day of August, 1999

Q. TODD DICKINSON

*Attest:*

*Attesting Officer*        *Acting Commissioner of Patents and Trademarks*